(12) United States Patent
Lee et al.

(10) Patent No.: US 10,269,099 B2
(45) Date of Patent: Apr. 23, 2019

(54) METHOD AND APPARATUS FOR IMAGE PROCESSING

(71) Applicant: Samsung Electronics Co., Ltd., Suwon-si, Gyeonggi-do (KR)

(72) Inventors: Jong-hun Lee, Suwon-si (KR); Young-su Moon, Seoul (KR); Yong-min Tai, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 15/519,786

(22) PCT Filed: Oct. 13, 2015

(86) PCT No.: PCT/KR2015/010772
§ 371 (c)(1),
(2) Date: Apr. 18, 2017

(87) PCT Pub. No.: WO2016/060439
PCT Pub. Date: Apr. 21, 2016

(65) Prior Publication Data
US 2017/0243328 A1   Aug. 24, 2017

(30) Foreign Application Priority Data
Oct. 16, 2014  (KR) .......................... 10-2014-0140169

(51) Int. Cl.
*G06K 9/48* (2006.01)
*G06T 5/00* (2006.01)
(Continued)

(52) U.S. Cl.
CPC ............... *G06T 5/002* (2013.01); *H04N 5/21* (2013.01); *H04N 5/44* (2013.01); *G06T 2207/20182* (2013.01)

(58) Field of Classification Search
CPC ...................... G06T 5/002; G06T 2207/20182
(Continued)

(56) References Cited

U.S. PATENT DOCUMENTS 5,848,185 A * 12/1998 Koga ........................ G06T 3/40
382/173
6,154,519 A    11/2000 Florent et al.
(Continued)

FOREIGN PATENT DOCUMENTS

JP     2010-218110 A    9/2010
KR  10-2007-0107353 A   11/2007
(Continued)

OTHER PUBLICATIONS

Mehmet K Ozkan et al., "Adaptive Motion-Compensated Filtering of Noisy Image Sequences", IEEE Transactions on Circuits and Systems for Video Technology, No. 4, Aug. 1993, pp. 277-290.*
(Continued)

*Primary Examiner* — Sheela C Chawan
(74) *Attorney, Agent, or Firm* — Jefferson IP Law, LLP

(57) ABSTRACT

An image-processing method of removing noise from an image includes: obtaining standard representative values for standard regions of a standard image and reference representative values for reference regions of a reference image, and obtaining a plurality of hierarchical images having different resolutions with respect to the standard image and the reference image based on the standard representative values and the reference representative values; obtaining the standard representative values for the standard regions of the standard image and the reference representative values for the reference regions of the reference image from the hierarchical images; determining a similarity between the standard regions and the reference regions from the standard representative values and the reference representative val-
(Continued)

ues; and removing noise by applying filtering to the standard image and the reference image depending on the determined similarity.

13 Claims, 11 Drawing Sheets

(51) Int. Cl.
*H04N 5/21* (2006.01)
*H04N 5/44* (2011.01)

(58) Field of Classification Search
USPC ........ 382/220, 275, 173, 190, 254, 260–265
See application file for complete search history.

(56) References Cited

U.S. PATENT DOCUMENTS

| | | | |
|---|---|---|---|
| 7,782,378 B2 | 8/2010 | Zhang et al. | |
| 7,856,150 B2 | 12/2010 | Li et al. | |
| 8,300,985 B2 | 10/2012 | Lee et al. | |
| 9,679,223 B2 * | 6/2017 | Moon | G06K 9/6215 |
| 2003/0228064 A1 | 12/2003 | Gindele et al. | |
| 2006/0109903 A1 * | 5/2006 | Bergen | H04N 5/144 |
| | | | 375/240.12 |
| 2009/0132947 A1 | 5/2009 | Seol | |
| 2011/0274350 A1 | 11/2011 | Hara | |
| 2011/0299781 A1 | 12/2011 | Schoenblum et al. | |
| 2012/0045095 A1 | 2/2012 | Tate et al. | |
| 2012/0224789 A1 | 9/2012 | Chatterjee et al. | |
| 2014/0141392 A1 | 5/2014 | Yoon et al. | |
| 2014/0226905 A1 | 8/2014 | Yahata et al. | |

FOREIGN PATENT DOCUMENTS

| | | |
|---|---|---|
| KR | 10-0859073 B1 | 9/2008 |
| KR | 10-2009-0027053 A | 3/2009 |
| KR | 10-2014-0141392 A | 12/2014 |

OTHER PUBLICATIONS

Ozkan, M.K et, "Adaptive motion-compensated filtering of noisy image sequences", IEEE Transactions on Circuits and Systems viedo technology, Aug. 1993, vol. 3, pp. 277-290.
Eric P. Bennett, and Leonard McMillan, "Video Enhancement Using Per-Pixel Virtual Exposures,", The University of North Carolina at Chapel Hill, ACM Trans. Graph., vol. 24, 2005.

* cited by examiner

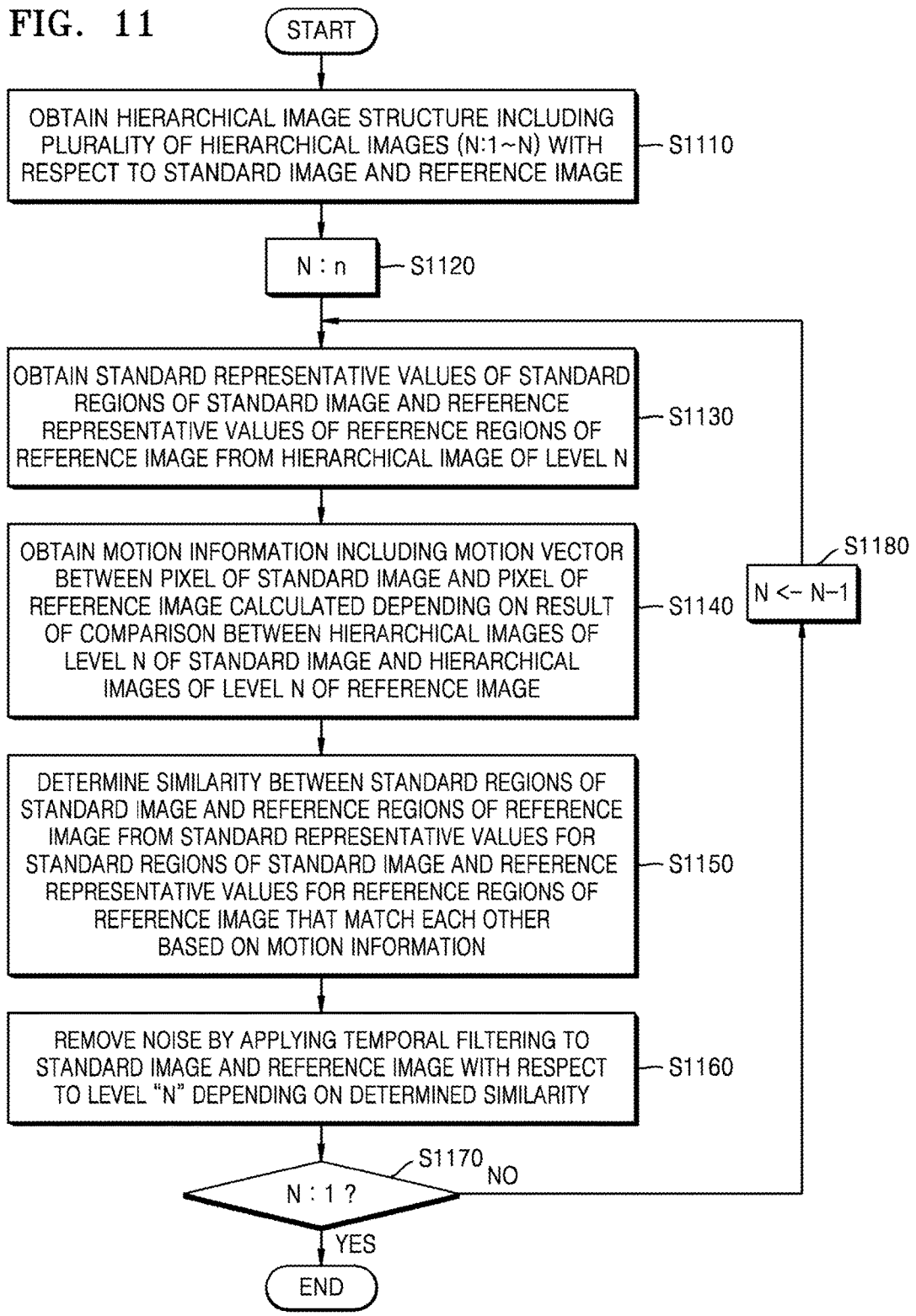

METHOD AND APPARATUS FOR IMAGE PROCESSING

CROSS-REFERENCE TO RELATED APPLICATION(S)

This application is a U.S. National Stage application under 35 U.S.C. § 371 of an International application filed on Oct. 13, 2015 and assigned application number PCT/KR2015/010772, which claimed the benefit of a Korean patent application filed on Oct. 16, 2014 in the Korean Intellectual Property Office and assigned Serial number 10-2014-0140169, the entire disclosure of each of which is hereby incorporated by reference.

TECHNICAL FIELD

The present disclosure relates to methods and apparatuses for processing an image, and more particularly, to methods and apparatuses for processing an image, which generate an output image having improved image quality from a plurality of input images.

BACKGROUND ART

In the case of capturing an image by using an image-capturing apparatus such as a digital camera in a poor image-capturing environment such as a dark environment where illuminance is relatively low or backlit, image quality deterioration may occur. For example, in the case of setting a long exposure time in order to secure a sufficient exposure time and performing capturing, a motion blur phenomenon due to a long shutter speed, shaking of an image-capturing apparatus, or motion of an object may occur. Also, in the case of setting sensitivity of a camera to high sensitivity and performing capturing, a dark image is amplified together with a noise component, so that a large amount of noise may appear on an image on the whole.

To resolve an image quality deterioration problem of an image captured in such a low illuminance environment, technology for removing motion blur based on one resultant image sheet, high performance noise-removing technology, etc. have been developed. Recently, technology for blending and processing a plurality of images, rather than just one image sheet is under development.

DISCLOSURE

Technical Problem

Provided are methods and apparatuses for processing an image, which improve a noise-removing speed by reducing an amount of operations and an amount of memory motions required for determining similarity when generating an output image having an improved image quality by using a plurality of images.

Provided is a non-transitory computer-readable recording medium having recorded thereon a program for executing on a computer a method of processing an image according to an exemplary embodiment. Technical objects to be achieved by an exemplary embodiment are not limited to the above objects, and other technical objects may be inferred from exemplary embodiments below.

Additional aspects will be set forth in part in the description which follows and, in part, will be apparent from the description, or may be learned by practice of the presented exemplary embodiments.

Technical Solution

According to an aspect of an exemplary embodiment, an image-processing method of removing noise from an image includes: obtaining standard representative values for standard regions of a standard image and reference representative values for reference regions of a reference image, and obtaining a hierarchical image structure including a plurality of hierarchical images having different resolutions with respect to the standard image and the reference image based on the standard representative values and the reference representative values; obtaining the standard representative values for the standard regions of the standard image and the reference representative values for the reference regions of the reference image from the hierarchical images; determining a similarity between the standard regions and the reference regions from the standard representative values and the reference representative values; and removing noise by applying filtering to the standard image and the reference image depending on the determined similarity.

The standard representative values may be obtained from pixel values of pixels inside the standard regions, and the reference representative values may be obtained from pixel values of pixels inside the reference regions.

Each standard representative value may be an average value or a weighted average value of the pixel values inside the standard regions, and each reference representative value may be an average value or a weighted average value of the pixel values inside the reference regions.

The method may further include: obtaining motion information including a motion vector between a pixel of the standard image and a pixel of the reference image calculated depending on a result of comparing the hierarchical images of the standard image with the hierarchical images of the reference image.

The determining of the similarity may include: determining the similarity by comparing the standard representative values of the standard regions with the reference representative values of the reference regions that match the standard representative values, based on the motion information.

The determining of the similarity may include: determining the similarity by comparing an absolute value of a difference between the standard representative values and the reference representative values with a threshold determined in advance.

The removing of the noise may include: when it is determined that the standard regions of the standard image are similar to the reference regions of the reference image, applying filtering to the standard regions of the standard image and the reference regions of the reference image; and when it is determined that the standard regions of the standard image are not similar to the reference regions of the reference image, not applying the filtering.

The method may include: sequentially performing the obtaining of the standard representative values and the reference representative values, the determining of the similarity, and the removing of the noise on a hierarchical image of an uppermost level to a hierarchical image of a lowest level of the hierarchical image structure.

According to an aspect of another exemplary embodiment, a non-transitory computer-readable recording medium has recorded thereon a program for executing the image-processing method.

According to an aspect of another exemplary embodiment, an image-processing apparatus for removing noise from an image includes: a hierarchical image structure-obtaining unit for calculating standard representative values for standard regions of a standard image and reference representative values for reference regions of a reference image, and obtaining a hierarchical image structure including a plurality of hierarchical images having different resolutions with respect to the standard image and the reference image based on the standard representative values and the reference representative values; a representative value-obtaining unit for obtaining the standard representative values for the standard regions of the standard image and the reference representative values for the reference regions of the reference image from the hierarchical images; a similarity-determining unit for determining a similarity between the standard regions and the reference regions from the standard representative values and the reference representative values; and a noise-removing unit for removing noise by applying temporal filtering to the standard image and the reference image depending on the determined similarity.

The hierarchical image structure-obtaining unit may obtain the standard representative values from pixel values of pixels inside the standard regions, and obtain the reference representative values from pixel values of pixels inside the reference regions.

The hierarchical image structure-obtaining unit may use each standard representative value as an average value or a weighted average value of the pixel values inside the standard regions, and use each reference representative value as an average value or a weighted average value of the pixel values inside the reference regions.

The image-processing apparatus may further include: a motion information-obtaining unit for obtaining motion information including a motion vector between a pixel of the standard image and a pixel of the reference image calculated depending on a result of comparing the hierarchical images of the standard image with the hierarchical images of the reference image.

The similarity-determining unit may determine the similarity by comparing the standard representative values of the standard regions with the reference representative values of the reference regions that match the standard representative values based on the motion information.

The similarity-determining unit may determine the similarity by comparing an absolute value of a difference between the standard representative values and the reference representative values with a threshold determined in advance.

When it is determined that the standard regions of the standard image are similar to the reference regions of the reference image, the noise-removing unit may apply temporal filtering to the standard regions of the standard image and the reference regions of the reference image, and when it is determined that the standard regions of the standard image are not similar to the reference regions of the reference image, the noise-removing unit may not apply the temporal filtering.

The image-processing apparatus may obtain an output image by sequentially performing an operation of the representative value-obtaining unit that obtains the standard representative values and the reference representative values, an operation of the similarity-determining unit that determines the similarity, and an operation of the noise-removing unit that removes the noise on a hierarchical image of an uppermost level to a hierarchical image of a lowest level of the hierarchical image structure.

Advantageous Effects

A noise-removing speed is improved by reducing an amount of operations and an amount of memory motions according to the method and the apparatus disclosed in the application.

DESCRIPTION OF DRAWINGS

These and/or other aspects will become apparent and more readily appreciated from the following description of the exemplary embodiments, taken in conjunction with the accompanying drawings in which:

FIG. 11 is a flowchart of explaining an image-processing method according to an exemplary embodiment.

BEST MODE

According to an aspect of an exemplary embodiment, an image-processing method of removing noise from an image includes: obtaining standard representative values for standard regions of a standard image and reference representative values for reference regions of a reference image, and obtaining a hierarchical image structure including a plurality of hierarchical images having different resolutions with respect to the standard image and the reference image based on the standard representative values and the reference representative values; obtaining the standard representative values for the standard regions of the standard image and the reference representative values for the reference regions of the reference image from the hierarchical images; determining a similarity between the standard regions and the reference regions from the standard representative values and the reference representative values; and removing noise by applying filtering to the standard image and the reference image depending on the determined similarity.

According to an aspect of another exemplary embodiment, an image-processing apparatus for removing noise from an image includes: a hierarchical image structure-obtaining unit for calculating standard representative values for standard regions of a standard image and reference representative values for reference regions of a reference image, and obtaining a hierarchical image structure including a plurality of hierarchical images having different resolutions with respect to the standard image and the reference image based on the standard representative values and the reference representative values; a representative value-obtaining unit for obtaining the standard representative values for the standard regions of the standard image and the reference representative values for the reference regions of the reference image from the hierarchical images; a similarity-determining unit for determining a similarity between the standard regions and the reference regions from the standard representative values and the reference representative values; and a noise-removing unit for removing noise by applying temporal filtering to the standard image and the reference image depending on the determined similarity.

MODE FOR INVENTION

Exemplary embodiments of the inventive concept are described in detail in a descriptive sense only and not for purposes of limitation with reference to the accompanying drawings. It should be understood that exemplary embodiments described below are provided for purposes of implementation only and not for limiting the spirit and scope of the inventive concept. It is construed that features or aspects easily inferred by a person of ordinary skill in the art from detailed descriptions and exemplary embodiments belong to the scope as defined by the following claims.

Figure 1:
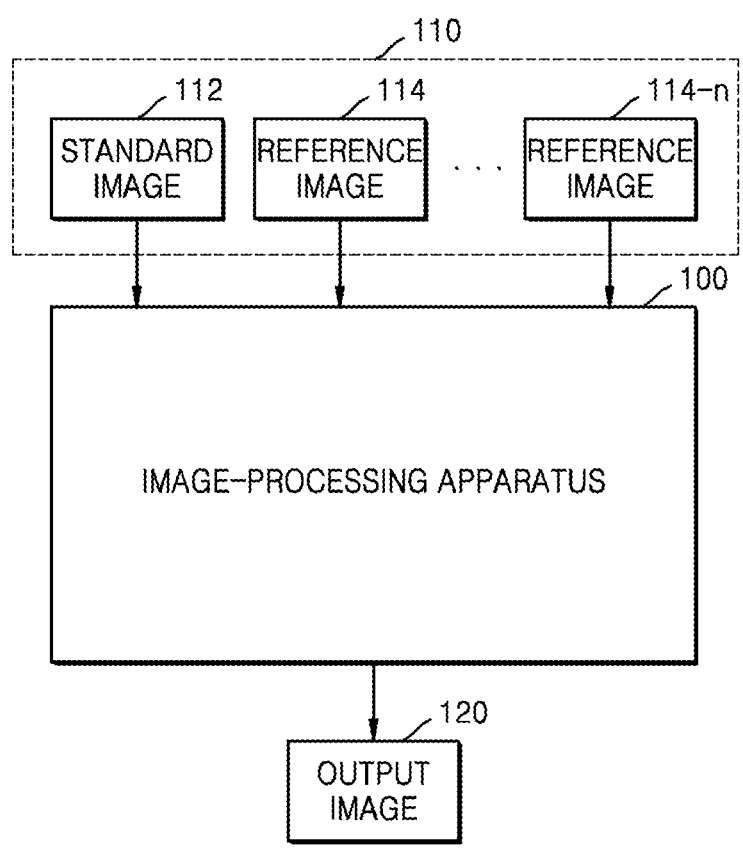
FIG. 1 is a block diagram for explaining an image-processing apparatus that generates an output image from a plurality of input images.

FIG. 1 is a block diagram for explaining an image-processing apparatus 100 that generates an output image from a plurality of input images 110.

The input images 110 represent images successively captured with a time interval or simultaneously captured for the same object. One of the input images 110 may be set as a standard image 112, and the rest of the input images 110 may be set as a first reference image 114 to an n-th reference image 114-n. The first reference image 114 to the n-th reference image 114-n may be "n" images as illustrated in FIG. 1, and in this case, "n" may be an integer equal to or greater than 1.

The standard image 112 denotes an image serving as a standard in an image process performed by the image-processing apparatus 100, and the first reference image 114 to the n-th reference image 114-n denote the rest of the images used for the image process. For example, the standard image 112 may be an image captured first among captured images for the same object, and the reference image 114 may be an image captured after the standard image 112. Discrimination between the standard image 112 and the reference image 114 is not limited to the above exemplary embodiment, and the image-processing apparatus 100 may determine the standard image 112 from among a plurality of images arbitrarily or according to a predetermined criterion. The reference image may be at least one image, and the present specification describes only the case of having one reference image 114 for convenience of description.

The image-processing apparatus 100 may generate an output image 120 which has been image-processed by using the standard image 112 and the reference image 114 as inputs. In the case of capturing an image with a short exposure time, image quality deterioration due to motion of an image-capturing apparatus such as a camera and motion of an object may be included in the standard image 112 and the reference image 114, and the image-processing apparatus 100 may remove such image quality deterioration and generate an image quality-improved output image 120. For example, the image-processing apparatus 100 may generate a high quality output image 120 by performing an image process such as removing of noise, sharpening, or contrast improvement.

As resolution that may be processed by an image sensor of the image-processing apparatus 100 such as a digital camera increases, resolution of the input images 110 also increases. For efficient utilization of a memory space in image-processing the input images 110 of high resolution, the input images 110 may be divided into an image region of a size less than a size of the entire image and processed. The image-processing apparatus 100 may estimate global motion information between the input images, and perform a tile image-based image process based on the global motion information.

Figure 2:
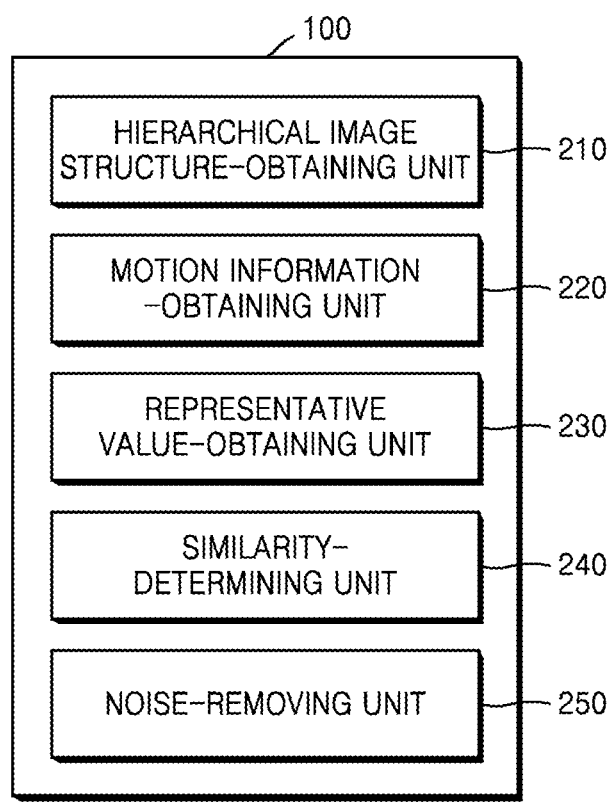
FIG. 2 is a block diagram illustrating a configuration of an image-processing apparatus according to an exemplary embodiment.

FIG. 2 is a block diagram illustrating a configuration of an image-processing apparatus 200 according to an exemplary embodiment.

The image-processing apparatus 200 may be the same as the image-processing apparatus 100 of FIG. 1. The image-processing apparatus 200 may include a hierarchical image structure-obtaining unit 210, a motion information-obtaining unit 220, a representative value-obtaining unit 230, a similarity-determining unit 240, and a noise-removing unit 250.

The image-processing apparatus 200 may obtain the input images 110. The image-processing apparatus 200 may discriminate between the standard image 112 and the input images 110. If the standard image 112 is not determined in advance, the image-processing apparatus 200 may determine the standard image 112 from the input images 110.

Figure 3:
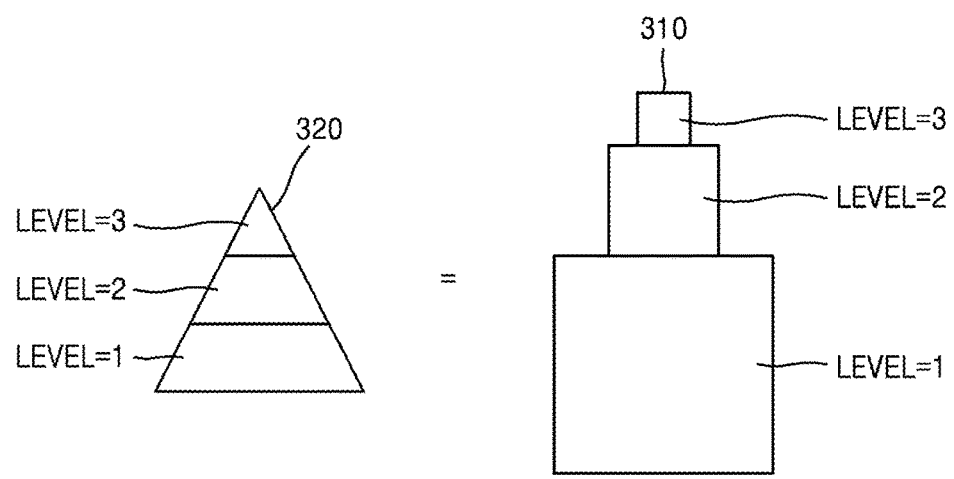
FIG. 3 is a diagram for explaining a hierarchical image structure according to an exemplary embodiment.
Figure 4:
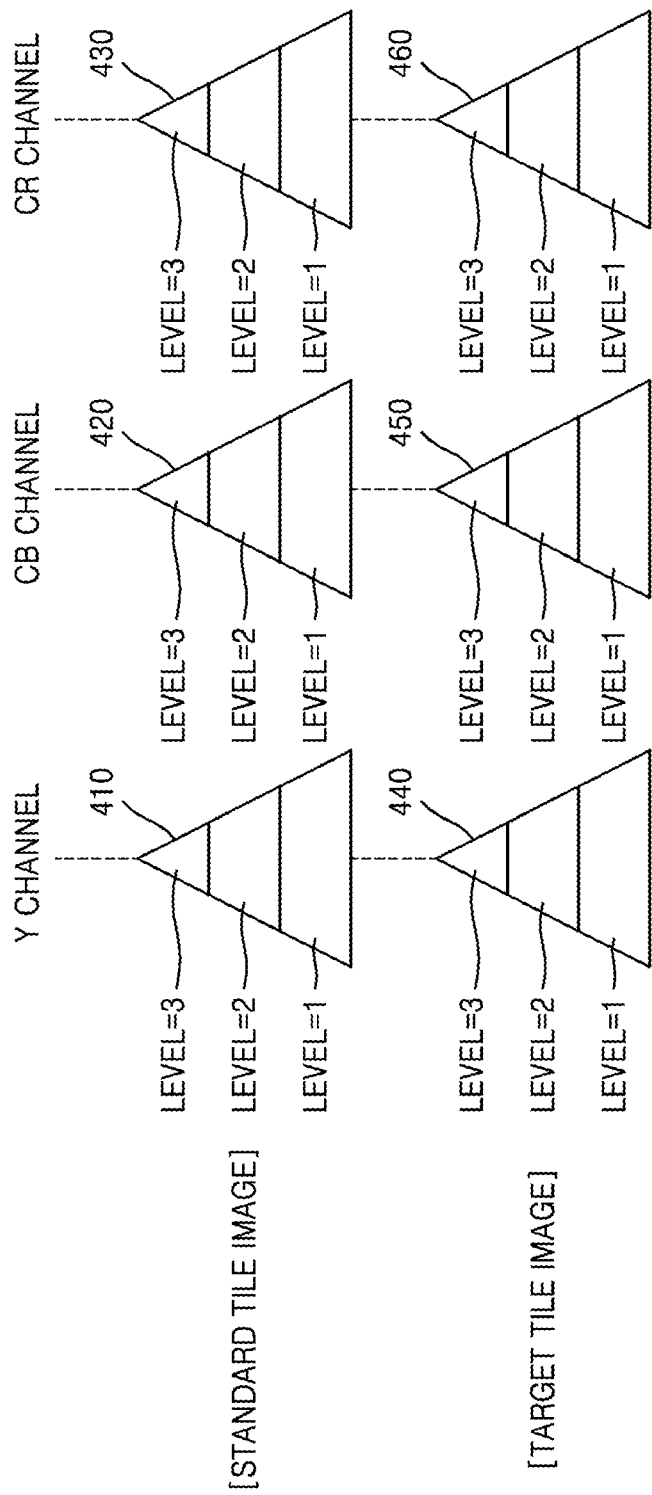
FIG. 4 is a diagram illustrating a hierarchical image structure obtained for each image channel according to an exemplary embodiment.

The hierarchical image structure-obtaining unit 210 may obtain a hierarchical image structure of each of the input images 110. The number of hierarchies forming the hierarchical image structure may be two or more. The number of hierarchies forming the hierarchical image structure may be determined depending on the resolution of the input images 110. The hierarchical image structure of the input images 110 may have the same number of hierarchies. FIGS. 3 and 4 illustrate exemplary embodiments of the hierarchical image structure, which are described below.

FIG. 3 is a diagram for explaining a hierarchical image structure 310 according to an exemplary embodiment.

A diagram 310 of FIG. 3 illustrates the hierarchical image structure 310 having a three-level hierarchical structure, and a diagram 320 of FIG. 3 expresses the hierarchical image structure 310 in the form of a figure. For convenience of description, FIG. 3 assumes that the diagram 310 is a Laplacian image pyramid, and the sizes of a standard image and a reference image are (horizontal length H, vertical length W)=(H×W).

In the case where the hierarchical image structure 310 is a Laplacian image pyramid, a pyramid image of an uppermost level (level=3) may have a low frequency band component, and a pyramid image may have a higher frequency band component as a level is lowered. Therefore, a lowest level (level=1) may have a highest frequency band component. Also, if the size of the reference image is (H×W), the size of the image at "level=1" is (H×W), the size of the image at "level=2" is (H/2×W/2), and the size of the image at "level=3" is (H/4×W/4).

An image at "level=2" in the Gaussian image pyramid may be obtained by applying Gaussian Smoothing to an image at "level=1". The Gaussian Smoothing denotes an image process of obtaining an average value or a weighted average value of pixels in a predetermined region, determining the obtained value as a representative value, and processing a pixel having the representative value as a representative pixel of pixels of the predetermined region. For example, an average value of pixels inside a region having a specific size of 2×2 in an image at "level=1" may be obtained. Also, the average value may be determined as a representative value of the pixels inside the specific region. Also, a pixel from among pixels of an image at "level=2" that corresponds to pixels inside the region having the specific size of 2×2 has the same value as the representative value of the pixels inside the region having the specific size of 2×2. Likewise, this image process may be equally applied to pixels inside another region having a size of 2×2 in the image at "level=1", and a pixel of the image at "level=2" that corresponds to the pixels.

The image-processing apparatus 200 may perform a series of image processes on an uppermost level to a lowest level of the hierarchical image structure 310, and apply a result of the process at a relevant level to an image process of the next lower level.

FIG. 4 is a diagram illustrating a hierarchical image structure obtained for each image channel according to an exemplary embodiment.

FIG. 4 expresses, in the form of a diagram, hierarchical image structures having a three-level hierarchical structure. An image-processing apparatus may obtain a hierarchical image structure for each image channel that configures a standard image and a reference image. For example, in the case where the standard image and the reference image have a color space of YCbCr, the image-processing apparatus may use the hierarchical image structure configured for each image channel of the standard image and the reference image. The standard image may have a hierarchical image structure 410 of a Y channel, a hierarchical image structure 420 of a Cb channel, and a hierarchical image structure 430 of a Cr channel. The reference image may have a hierarchical image structure 440 of a Y channel, a hierarchical image structure 450 of a Cb channel, and a hierarchical image structure 460 of a Cr channel.

The image-processing apparatus may apply an image-process result of one of image channels to an image process of the rest of the image channels. For example, the image-processing apparatus may apply an image-process result at the hierarchical image structures 410 and 440 of the Y channel to an image process at the hierarchical image structures 420 and 450 of the Cb channel.

If the standard image and the reference image have a YCbCr444 type, the image-processing apparatus may directly apply the magnitude of motion derived during an image process procedure of the Y channel to an image process procedure of the Cb channel and the Cr channel. In the case where the standard image and the reference image have a YCbCr422 type, the image-processing apparatus may adjust the magnitude of motion derived during an image process procedure of the Y channel and apply the adjusted magnitude to an image process procedure of the Cb channel and the Cr channel. For example, in the case where an image size of a brightness channel (Y channel) is (horizontal length H, vertical length W) and an image size of a chroma channel (Cb channel and Cr channel) is (horizontal length H/2, vertical length W), the image-processing apparatus may directly apply the magnitude of motion in the vertical direction among the magnitudes of motion derived during an image process procedure of the brightness channel to the chroma channel, and reduce the magnitude of motion in the horizontal direction by half and apply the same to the chroma channel.

Referring to FIG. 2 again, the hierarchical image structure-obtaining unit 210 may determine hierarchical image information of a current level by reflecting an image process result of the previous level in images of respective levels configuring hierarchical image structures of an upper level image to a lower level image. In the case of an uppermost level, since there is no previous upper level, hierarchical image information of the uppermost level may be directly used. In the case of a non-uppermost level, new hierarchical image information of a current level may be determined by projecting and reflecting a differential image between result image information processed at the previous upper level and hierarchical image information before an image process to hierarchical image information of the current level in a current level direction.

The motion information-obtaining unit 220 may estimate motion information representing a motion degree of the reference image 114 with respect to the standard image 112. The motion information may include a motion vector existing between the standard image 112 and the reference image 114, and may include information for a global motion vector or a local motion vector, or information for both the global motion vector and the local motion vector. The global motion vector denotes a degree of a position difference which the reference image 114 or a reference region of the reference image 114 relatively has with respect to the standard image 112 or a standard region of the standard image 112. The motion information is estimated from an upper hierarchy of the standard image 112 and the reference image 114, and the motion information estimated at the upper hierarchy is used for estimating motion information of a lower hierarchy of the standard image 112 and the reference image 114. More specifically, the motion information estimated at the upper hierarchy may be used for setting an exploration region inside the reference image 114 when estimating motion information representing a motion degree of the reference image 114 with respect to the standard image 112 in the lower hierarchy. Since the motion information-obtaining unit 220 sequentially performs motion information estimation on the upper hierarchy to the lower hierarchy as described above, the motion information-obtaining unit 220 does not explore the entire region of the reference image 114 in order to estimate motion information, and thus estimate the motion information swiftly and efficiently.

The global motion information-obtaining unit 220 may obtain an accumulated image 1D curve of the horizontal direction and an accumulated image 1D curve of the vertical direction including accumulated pixel values for each column and each row of the standard image 112, and obtain an accumulated image 1D curve of the horizontal direction and an accumulated image 1D curve of the vertical direction including accumulated pixel values for each column and each row of the reference image 114. The accumulated image 1D curve is described below with reference to FIG. 5.

Figure 5:
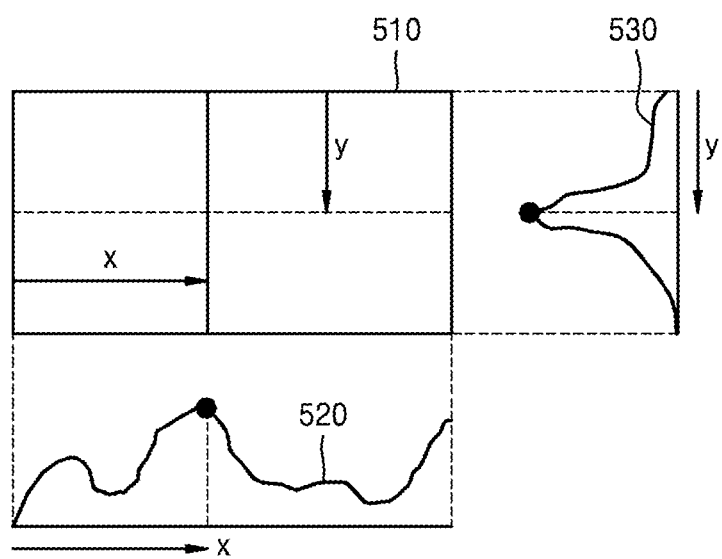
FIG. 5 is a diagram illustrating an exemplary embodiment of obtaining an accumulated image 1D curve.

FIG. 5 is a diagram illustrating an exemplary embodiment of obtaining an accumulated image 1D curve.

FIG. 5 illustrates an example where an image-processing apparatus obtains an accumulated image 1D curve in order to estimate motion information. The image-processing apparatus may obtain the accumulated image 1D curve by using the same method for both a standard image and a reference image. A process of obtaining an accumulated image 1D curve of a reference image 510 is described below with reference to FIG. 5.

The image-processing apparatus may sum up pixel values of all image pixels located on an arbitrary column while moving in the horizontal direction (x direction) of the reference image 510. The image-processing apparatus may obtain an accumulated image 1D curve 520 in the horizontal direction by displaying the summed result as a height value on the 1D curve.

Also, the image-processing apparatus may sum up pixel values of all image pixels located on an arbitrary row while moving in the vertical direction (y direction) of the reference image 510. Likewise, the image-processing apparatus may obtain an accumulated image 1D curve 530 in the vertical direction by displaying the summed result as a height value on the 1D curve.

The accumulated image 1D curves 520 and 530 in the horizontal and vertical directions obtained via the above process may represent accumulated pixel values for each horizontal direction and each vertical direction. For example, a curve value at an arbitrary position on the accumulated image 1D curve 520 in the horizontal direction may represent an accumulated value of pixel values included in a column of a relevant position in the reference image 510.

Referring to FIG. 2 again, the motion information-obtaining unit 220 may estimate motion information by comparing patterns between the accumulated image 1D curve in the horizontal direction obtained by connecting accumulated pixel values for each column of the standard image 112 and the accumulated image 1D curve in the horizontal direction obtained by connecting accumulated pixel values for each column of the reference image 114, and by comparing again patterns between the accumulated image 1D curve in the vertical direction obtained by connecting accumulated pixel values for each row of the stand image 112 and the accumulated image 1D curve in the vertical direction obtained by connecting accumulated pixel values for each row of the reference image 114.

The global motion information-obtaining unit 220 may set an exploration region based on accumulated pixel values in the accumulated image 1D curve in the horizontal direction of the standard image 112, and detect a relative position where mutual correlation between accumulated pixel values in the horizontal direction of the standard image 112 and accumulated pixel values in the horizontal direction of the reference image 114 is maximized inside the exploration region. The motion information-obtaining unit 220 may estimate motion of the reference image 114 in the horizontal direction by using the relative position where the mutual correlation is maximized.

The global motion information-obtaining unit 220 may estimate motion of the reference image 114 in the vertical direction by setting an exploration region based on accumulated pixel values in the accumulated image 1D curve in the vertical direction of the standard image 112, and detecting a relative position where mutual correlation between accumulated pixel values in the vertical direction of the standard image 112 and accumulated pixel values in the vertical direction of the reference image 114 is maximized inside the exploration region. The motion information-obtaining unit 220 may use various techniques including a normalized cross correlation (NCC) technique in order to estimate mutual correlation. Motion information estimation is described below with reference to FIGS. 6A and 6B.

Figure 6A:
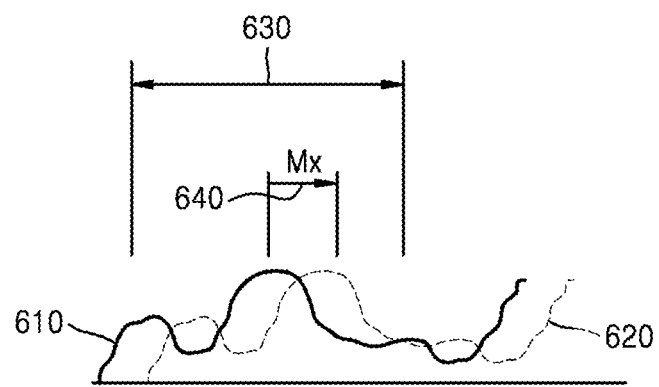
FIGS. 6A and 6B are diagrams illustrating an exemplary embodiment of estimating motion information.
Figure 6B:
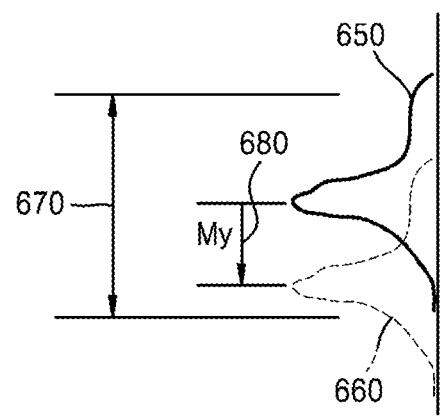

FIGS. 6A and 6B are diagrams illustrating an exemplary embodiment of estimating motion information. FIGS. 6A and 6B illustrates an exemplary embodiment in which the motion information-obtaining unit 220 of the image-processing apparatus 100 estimates first motion information by comparing patterns between accumulated image 1D curves 610 and 620 in the horizontal direction of the standard image 112 and the reference image 114, and comparing patterns between accumulated image 1D curves 650 and 660 in the vertical direction of the standard image 112 and the reference image 114.

FIG. 6A illustrates the accumulated image 1D curve 610 of the standard image 112 and the accumulated image 1D curve 620 of the reference image 114 in the horizontal direction. The motion information-obtaining unit 220 may set a predetermined exploration region 630 based on the accumulated image 1D curve 610 of the standard image 112. For example, the motion information-obtaining unit 220 may set the exploration region 630 based on a maximum point, a minimum point, an inflection point, etc. on the accumulated image 1D curve 610 of the standard image 112.

The motion information-obtaining unit 220 may detect a relative position where mutual correlation between the accumulated image 1D curve 610 of the standard image 112 and the accumulated image 1D curve 620 of the reference image 114 is maximized. At the detected relative position, the accumulated image 1D curve 610 of the standard image 112 and the accumulated image 1D curve 620 of the reference image 114 may have maximum similarity. The motion information-obtaining unit 220 may estimate the magnitude (Mx) 640 of motion in the horizontal direction based on the relative position where mutual correlation is maximized.

In FIG. 6B, the motion information-obtaining unit 220 may set an exploration region 670, and estimate the magnitude (My) 680 of motion in the vertical direction based on a relative position where mutual correlation between the accumulated image 1D curve 650 of the standard image 112 and the accumulated image 1D curve 660 of the reference image 114 in the vertical direction is maximized in the exploration region 670 by using the same method performed in FIG. 6A with respect to even the accumulated image 1D curve 650 of the standard image 112 and the accumulated image 1D curve 660 of the reference image 114 in the vertical direction.

In the case where global motion between the standard image 112 and the reference image 114 is translational motion, the motion information-obtaining unit 220 of the image-processing apparatus 100 may estimate first motion information based on the magnitude (Mx) 640 of motion in the horizontal direction and the magnitude (My) 680 of motion in the vertical direction.

The motion information-obtaining unit 220 may set a plurality of motion exploration regions for estimating motion to the standard image 112 and the reference image 114 in order to process an extended motion model as well as translational motion. The motion information-obtaining unit 220 may estimate first motion information through comparison for each horizontal direction and each vertical direction between accumulated pixel values of the standard image 112 and accumulated pixel values of the reference image 114 in the set plurality of motion exploration regions. The motion information-obtaining unit 220 may estimate a motion degree of translational motion in each motion exploration region, and estimate motion of an extended motion model such as rotation of the reference image 114 by analyzing a result of the estimation. For example, in the case where motion exploration regions have been set at the up, down, left, and right of an input image, the motion information-obtaining unit 220 may estimate a degree of motion by which the reference image 114 moves compared with the standard image 112 from a position of the respective motion exploration regions. The motion information-obtaining unit 220 may estimate rotational motion of the reference image 114 by analyzing a motion degree in the four motion exploration regions.

The motion information-obtaining unit 220 may update motion information representing a motion degree of the reference image 114 with respect to the standard image 112. The motion information-obtaining unit 220 may estimate or update motion information for images of the same level in a hierarchical image structure of the standard image 112 and a hierarchical image structure of the reference image 114. For example, for images of each level in a hierarchical image structure, the motion information-obtaining unit 220 may estimate motion information in a lower hierarchy by using a method similar to a method which the motion information-obtaining unit 220 has performed for estimating motion information in an upper hierarchy.

In the hierarchical image structure for each of the standard image 112 and the reference image 114, the motion information-obtaining unit 220 may estimate motion information of images of the same level. The motion information-obtaining unit 220 may compare patterns between an accumulated image 1D curve in the horizontal direction obtained by connecting accumulated pixel values for each column of the standard image 112 and an accumulated image 1D curve in the horizontal direction obtained by connecting accumulated pixel values for each column of the reference image 114. Likewise, the motion information-obtaining unit 220 may compare patterns between an accumulated image 1D curve in the vertical direction obtained by connecting accumulated pixel values for each row of the standard image 112 and an accumulated image 1D curve in the vertical direction obtained by connecting accumulated pixel values for each row of the reference image 114. Also, the motion information-obtaining unit 220 may estimate motion information based on a result of the comparison of patterns between the 1D curves in the horizontal direction and a result of the comparison of patterns between the 1D curves in the vertical direction. However, the motion information-obtaining unit 220 may use motion information estimated at an upper level as basic information and use the basic information as an initial value for estimating motion information estimated at a lower level. That is, the motion information-obtaining unit 220 may set an exploration region based on a motion initial value derived from the motion information estimated at the upper level. Accordingly, the motion information-obtaining unit 220 may reduce an exploration region in the reference image 114, and estimate motion more accurately.

Figure 7A:
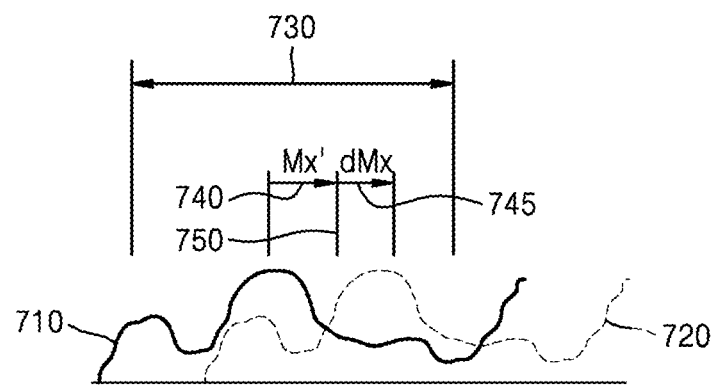
FIGS. 7A and 7B are diagrams illustrating an exemplary embodiment of estimating motion information of a lower hierarchy based on motion information of an upper hierarchy.
Figure 7B:
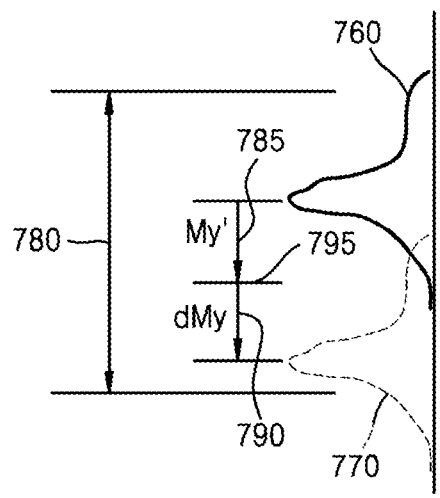

FIGS. 7A and 7B are diagrams illustrating an exemplary embodiment of estimating motion information of a lower hierarchy based on motion information of an upper hierarchy.

FIGS. 7A and 7B illustrates an exemplary embodiment in which the motion information-obtaining unit 220 of the image-processing apparatus 100 estimates motion information of a lower level by comparing patterns between accumulated image 1D curves in the horizontal direction of the standard image 112 and the reference image 114, and comparing patterns between accumulated image 1D curves in the vertical direction of the standard image 112 and the reference image 114 with respect to an image of the same level in a hierarchical image structure of each of the standard image 112 and the reference image 114.

FIG. 7A illustrates an accumulated image 1D curve 710 of the standard image 112 in the horizontal direction and an accumulated image 1D curve 720 of the reference image 114 in the horizontal direction. The motion information-obtaining unit 220 may set a predetermined exploration region 730 based on the accumulated image 1D curve 710 of the standard image 112. In this case, the motion information-obtaining unit 220 may set the exploration region based on a motion initial value derived from motion information in an upper level. For example, in the case of estimating motion in the horizontal direction, the motion information-obtaining unit 220 may set a central position 750 of the exploration region 730 based on a motion initial value (Mx') 740 in the horizontal direction derived from first motion information. The motion information-obtaining unit 220 may estimate the magnitude (dMx) 745 of motion in the horizontal direction by using a relative position where mutual correlation between an accumulated image 1D curve 710 of the standard image 112 and an accumulated image 1D curve 720 of the reference image 114 is maximized in the exploration region 730.

In FIG. 7B, the motion information-obtaining unit 220 may set a central position 795 of an exploration region 780 based on a motion initial value (My') 785 in the vertical direction derived from motion information in an upper level with respect to even an accumulated image 1D curve 760 of the standard image 112 and an accumulated image 1D curve 770 of the reference image 114 in the vertical direction, and estimate the magnitude (dMy) 790 of motion in the vertical direction based on a relative position where mutual correlation between the accumulated image 1D curve 760 of the standard image 112 and the accumulated image 1D curve 770 of the reference image 114 in the vertical direction is maximized in the exploration region 780.

The motion information-obtaining unit 220 may estimate motion information at a lower level based on a motion initial value (Mx') 740 in the horizontal direction derived from motion information in an upper level, a motion initial value (My') 785 in the vertical direction derived from motion information in the upper level, the magnitude (dMx) 745 of motion in the horizontal direction, and the magnitude (dMy) 790 of motion in the vertical direction. For example, magnitudes MX and MY of final motion in the horizontal direction and the vertical direction included in motion information in the lower level may be represented by using Equation below $$MX = Mx' + dMx \qquad \text{Equation 1}$$

$$MY = My' + dMy \qquad \text{Equation 2}$$

Local motion information may be explored on a block basis. A standard image is divided into blocks of various sizes, and then a block most similar to a block of the standard image is found from a target image. In this case, for a method of finding out a most similar block, sum of differences (SAD) or sum of square error (SSE) of pixels of two blocks, etc., may be used. Like the global motion exploration, to reduce an amount of calculation, exploration on a block basis may predict motion information in advance and then limit an information exploration region to exploration of only a limited neighboring region. The exploration on a block basis may utilize motion information, etc. of a relevant position block of an upper level.

Referring to FIG. 2 again, the similarity-determining unit 240 determines similarity between standard regions of a standard image and reference regions of a reference image based on motion information estimated by the motion information-obtaining unit 220. The similarity-determining unit 240 may match standard regions obtained by dividing the standard image into a predetermined size and reference regions obtained by dividing the reference image into a predetermined size by using motion information. The similarity-determining unit 240 may use a standard representative value and a reference representative value representing a standard region and a reference region in determining similarity. The representative value-obtaining unit 230 may obtain the standard representative value and the reference representative value by using various methods. An operation speed of similarity determination and an amount of memory movement may improve depending on a method of determining similarity. Therefore, whether an operation speed of similarity determination and an amount of memory movement improve is explained by comparing a conventional similarity determination method with a similarity determination method proposed by an exemplary embodiment.

Figure 8:
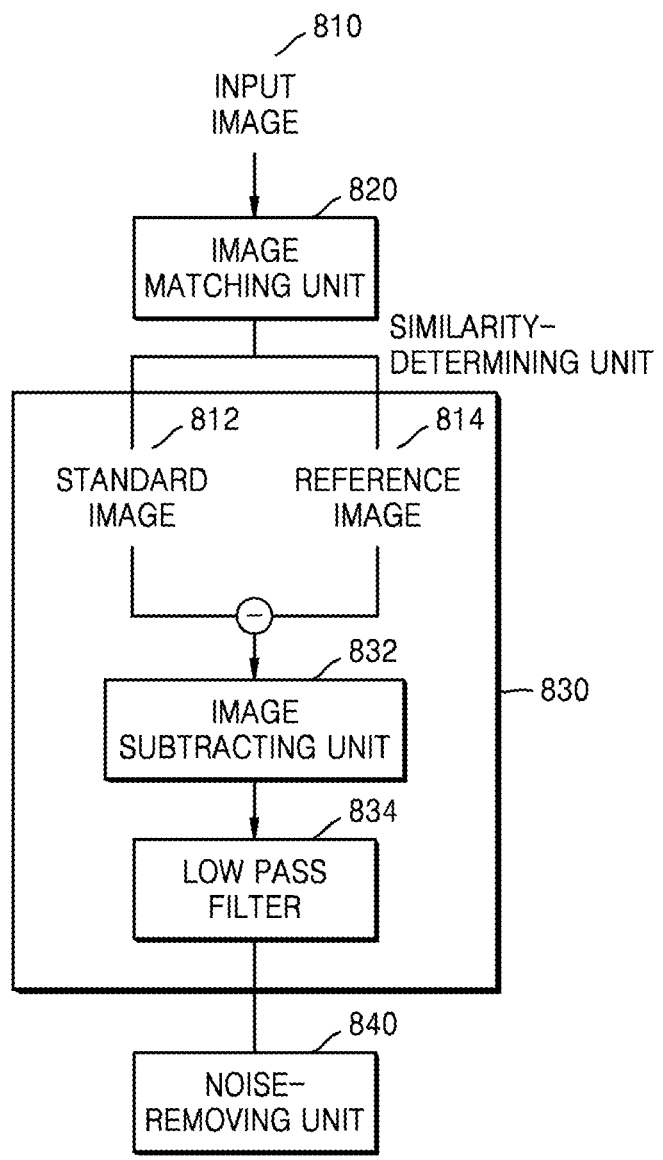
FIG. 8 is a schematic diagram illustrating a method of image-processing input images in the case of directly comparing a standard image with a reference image when calculating similarity.
Figure 9:
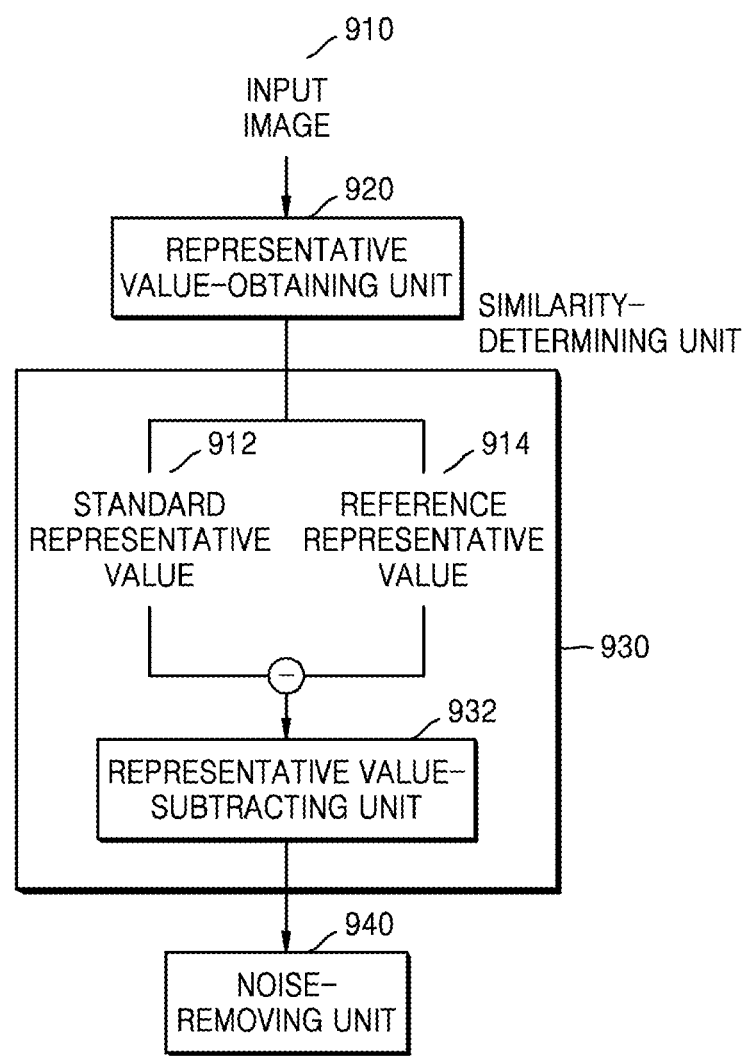
FIG. 9 is a schematic diagram illustrating a method of image-processing input images in the case of comparing a standard representative value with a reference representative value simultaneously obtained while obtaining a hierarchical image structure during a similarity calculation.

FIGS. 8 and 9 illustrate a conventional similarity determination method and a similarity determination method proposed by an exemplary embodiment, respectively. Features and effects of the inventive concept when determining similarity are described with reference to FIGS. 8 and 9.

FIG. 8 is a schematic diagram illustrating a similarity determination method of input images in the case of directly comparing a standard image with a reference image when determining similarity.

An input image 810 includes a standard image 812 and a reference image 814. The standard image 812 and the reference image 814 of FIG. 8 respectively denote images of one hierarchy whose motion information has been determined among a hierarchical image structure of the standard image 112 and the reference image 114 of FIG. 1.

Before comparing the standard image 812 with the reference image 814, an image matching unit 820 detects each reference region of the reference image 814 that corresponds to each standard region of the standard image 812 by using motion information between the standard image 812 and the reference image 814. Also, the image matching unit 820 matches the standard image 812 with the reference image 814 by using a standard region and a reference region that correspond to each other.

A similarity-determining unit 830 determines similarity by comparing standard regions of the standard image 812 with reference regions of the reference image 814 that correspond to respective standard regions. The similarity-determining unit 830 may include an image subtracting unit 832 that obtains a subtracted image by calculating an absolute value of a difference in brightness or a color difference component between pixels of a standard region and a reference region corresponding to the standard region, and a low pass filter 834 that determines similarity from the subtracted image obtained from the image subtracting unit 832.

For example, in the case of determining similarity by using a brightness component of each pixel of a standard region, the image subtracting unit 832 obtains the brightness component of each pixel of the standard region and a brightness component of each pixel of a reference region corresponding to the standard region. Also, the image subtracting unit 832 obtains an absolute value of a difference between the obtained brightness components of the pixels. Also, the image subtracting unit 832 obtains a subtracted image having the absolute value of the difference between the brightness components of the pixels as a brightness component of each pixel.

The low pass filter 834 may obtain an average value or a weighted average value of the subtracted image by applying a Gaussian Smoothing filter to the subtracted image obtained by the image subtracting unit 832. Also, the average value or the weighted average value may be determined as similarity.

A noise-removing unit 840 removes a noise of an input image 810 based on similarity determined by the similarity-determining unit 830.

FIG. 9 is a schematic diagram illustrating a similarity-determining method of input images in the case of comparing a standard representative value with a reference representative value simultaneously obtained while obtaining a hierarchical image structure during similarity determination.

An input image 910 is the same as the input image 810 of FIG. 8.

A representative value-obtaining unit 920 may obtain a standard representative value 912 and a reference representative value 914 from the hierarchical image structure-obtaining unit 210 of FIG. 2, for determination of a similarity-determining unit 930. The representative value-obtaining unit 920 denotes the representative value-obtaining unit 230 of FIG. 2. The hierarchical image structure-obtaining unit 210 of FIG. 2 obtains representative values of a standard image and a reference image when obtaining an upper hierarchical image from a lower hierarchical image.

For example, as illustrated in FIG. 3, in the case where a size of an image at "level=1" is (H×W), a size of an image at "level=2" is (H/2×W/2), and a size of an image at "level=3" is (H/4×W/4), the representative value-obtaining unit 920 may divide the image at "level=1" into regions having a size of 2×2 in order to obtain the image at "level=2" from the image at "level=1". In this case, the representative value-obtaining unit 920 may obtain an average value of brightness components included in four pixels from respective regions. An average value may be a value of a brightness component of pixels forming the image at "level=2". An average value may be determined as a representative value of a region having a size of 2×2 from which the average value has been derived. Likewise, a method performed during a process of obtaining the image at "level=2" from the image at "level=1" may be applied to even a process of obtaining the image at "level=3" from the image at "level=2".

For another example, a representative value of a region having a size of 2×2 of the image at "level=2" obtained during a process of obtaining the image at "level=3" may be a representative value of a region having a size of 4×4 of the image at "level=1".

A similarity-determining unit 930 determines whether a standard region is similar to a reference region by using a standard representative value 912 representing a standard region and a reference representative value 914 representing a reference region corresponding to the standard region instead of comparing the standard region with the reference region corresponding to the standard region. The similarity-determining unit 930 denotes the similarity-determining unit 240 of FIG. 2. The similarity-determining unit 930 may include a representative value-subtracting unit 932 that calculates an absolute value of a difference between a standard representative value 912 and a reference representative value 914 obtained by the representative value-obtaining unit 920.

The representative value-subtracting unit 932 calculates an absolute value of a difference between the standard representative value 912 and the reference representative value 914 obtained by the representative value-obtaining unit 920. The calculated absolute value may be determined as similarity.

The noise-removing unit 940 removes a noise of the input image 910 based on similarity determined by the similarity-determining unit 930.

Similarity=Gaussian Smoothing(AbsoluteDifferences (frame0,frame1))   Equation 3

Similarity=AbsoluteDifferences(GaussianSmoothing (frame0),GaussianSmoothing(frame1))   Equation 4

A difference between the similarity determination method of FIG. 8 and the similarity determination method of FIG. 9 are described based on Equations 3 and 4. Similarity of Equations 3 and 4 denotes a similarity degree. GaussianSmoothing denotes a function of obtaining an average value or a weighted average value of each component of pixels of an image by using a Gaussian Smoothing filter. AbsoluteDifferences denotes a function of obtaining an absolute value of a difference between variables. frame 0 and frame 1 respectively denote a standard image and a reference image input to GaussianSmoothing or AbsoluteDifferences.

The similarity determination method of FIG. 8 determines similarity by using Equation 3, and the similarity determination method of FIG. 9 determines similarity by using Equation 4. In the similarity determination method of FIG. 8 and the similarity determination method of FIG. 9, since an application sequence of a GaussianSmoothing function and an AbsoluteDifferences function is different, even when the same standard region and reference region are used as inputs, similarities of different values may be output. However, since the motion information-obtaining unit 220 compares a standard region with a reference region that correspond to each other, a probability that similarities of different values are output is very low. Therefore, similarity output by the similarity determination method of FIG. 8 and similarity output by the similarity determination method of FIG. 9 are almost the same.

Also, it is also possible to use the similarity determination method of FIG. 8 and the similarity determination method of FIG. 9 in a hybrid form. A result of similarity calculation of FIG. 9 is different from a result of similarity calculation according to a difference of Equations 3 and 4. In most cases, almost the same similarity is calculated by using the motion information-obtaining unit 220, but in a very extreme case, an error may occur. A particularly problematic case is a case where gradients of pixel values in the same direction are opposite to each other in a specific portion of two images. As understood by a person of ordinary skill in the art, it is difficult that the motion information-obtaining unit 220 selects above-mentioned two blocks in most of capturing. However, in the case where an abnormal operation such as moving a camera in a high speed during a capturing operation occurs, captured images become very different. In this case, when similarity of a relevant block is calculated, the method of FIG. 8 or the method of FIG. 9 may be selected based on difference information (for example, SAD, SSE, etc.) of two blocks calculated by the motion information-obtaining unit 220. For example, when an SAD value is very large compared with motion information-obtaining results of other blocks, the relevant case is determined as the above-described extreme case and a similarity is calculated as in FIG. 8. When an SAD value is similar to motion information-obtaining results of other blocks, a similarity may be calculated as in FIG. 9 according to an exemplary embodiment.

A difference in an amount of calculation of the similarity determination method of FIG. 8 and the similarity determination method of FIG. 9 is described based on Equations 3 and 4. The method of FIG. 8 obtains absolute values of differences between pixels of a standard region and pixels of a reference region corresponding to each other, calculates an average value or a weighted average value of the obtained absolute values, and defines the average value or the weighted average value as a representative value. That is, both GaussianSmoothing and AbsoluteDifferences of Equation 3 are performed in a similarity determination operation.

However, the method of FIG. 9 performs only an operation of obtaining a standard representative value of a standard region and a reference representative value of a reference region obtained in advance by the hierarchical image structure-obtaining unit 210, and calculating an absolute value of a difference between the standard representative value and the reference representative value. That is, only AbsoluteDifferences of Equation 4 is performed in a similarity determination operation. Also, since GaussianSmoothing utilizes again values obtained by the hierarchical image structure-obtaining unit 210, an amount of calculation reduces. Therefore, an amount of calculation of the similarity determination method of FIG. 9 is remarkably less than an amount of calculation of the similarity determination method of FIG. 8.

Similarly, even in an aspect of an amount of memory movements, the similarity determination method of FIG. 9 is more advantageous than the similarity determination method of FIG. 8. Since the similarity determination method of FIG. 8 uses an entire standard image and an entire reference image as inputs, and the similarity determination method of FIG. 9 uses only a standard representative value of respective standard regions and only a reference representative value of respective reference regions, an amount of memory transmissions of the similarity determination method of FIG. 9 is smaller.

When putting the above content together, it is revealed that the similarity determination method of FIG. 9 has an effect of remarkably reducing an amount of calculation and an amount of memory movements without performance deterioration compared with the similarity determination method of FIG. 8. Since an amount of calculation and an amount of memory movements reduce, an entire image process procedure becomes fast and a memory may be efficiently managed.

Referring to FIG. 2, the noise-removing unit 250 removes a noise of an image depending on similarity determined by the similarity-determining unit 240. The noise-removing unit 250 may remove a noise by using a temporal filter. The temporal filter denotes a filter that obtains an average value or a weighted average value of a standard region and a reference region corresponding to the standard region and located at a time point different from a time point of the standard region, and removes a noise. The temporal filter of the noise-removing unit 250 may remove a noise by obtaining weighted average values of the standard region and the reference region with different weights of the reference region depending on similarity between the standard region and the reference region. In the case where the reference image is not one but two or more, the noise-removing unit 250 may apply the temporal filter with different weight of each reference image depending on similarity between the reference images and the standard image.

The image-processing apparatus 100 has been divided into five partitions including the hierarchical image structure-obtaining unit 210, the motion information-obtaining unit 220, the representative value-obtaining unit 230, the similarity-determining unit 240, and the noise-removing unit 250, for convenience of description only, and the image-processing apparatus 100 may have different kinds of partitions.

Figure 10:
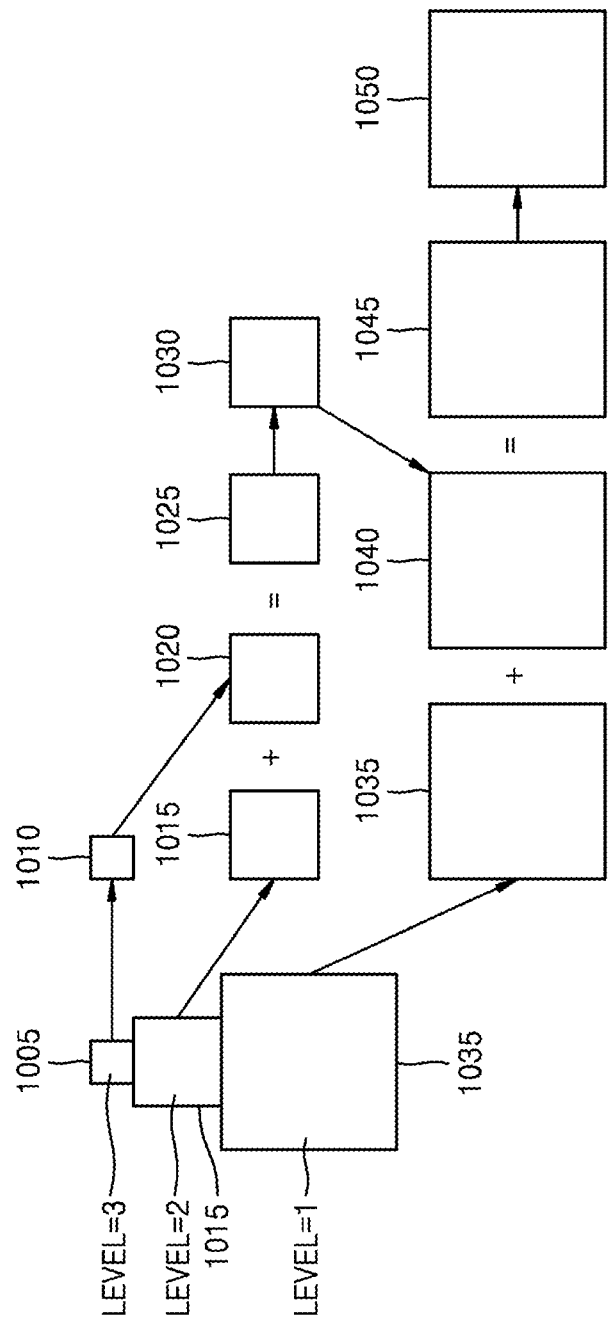
FIG. 10 is a block diagram for explaining an operation of performing an image process based on a hierarchical image structure.

FIG. 10 is a block diagram for explaining an operation of performing an image process based on a hierarchical image structure.

An image-processing apparatus may estimate motion of an image (low frequency band image) 1005 of an uppermost level (level=3) in an image hierarchical structure with respect to a standard image, perform an image process to obtain a result image (low frequency band image) 1010, and apply the result image 1010 to a current level. The image-processing apparatus may obtain an output image 1020 whose image size has been up-scaled in order to apply the result image 1010 obtained at the uppermost level to the next level.

The image-processing apparatus may obtain a new input image (low frequency band image) 1025 by applying the output image 1020 up-scaled at the uppermost level to an image (high frequency band image) 1015 of an intermediate level (level=2). Motion estimation information and an image-processed result of the result image 1010 of the uppermost level may be applied to the new input image 1025 obtained at the intermediate level. For example, since an image size of a lower level is two times larger than an image size of an upper level in a pyramid image structure, the image-processing apparatus may scale a motion estimation value estimated at the upper level by two times and use the scaled motion estimation value as a motion initial value at the lower level. Like an operation performed in the uppermost level, the image-processing apparatus may estimate motion of the new input image 1025 with respect to the standard image, and perform an image process to obtain a result image (low frequency band image) 1030. The image-processing apparatus may apply the result image 1030 to an intermediate level, which is a current level, and obtain an output image (low frequency band image) 1040 whose image size has been up-scaled in order to apply the obtained result image 1030 to the next level.

The image-processing apparatus may obtain a new input image (low frequency band image) 1045 by applying the output image 1040 up-scaled at an intermediate level to an image (high frequency band image) 1035 of a lowest level (level=1). Motion estimation information and an image-processed result of the result image 1030 of the intermediate level may be applied to the new input image 1045 obtained at the lowest level. For example, since an image size of a lower level is two times larger than an image size of an upper level in a pyramid image structure, the image-processing apparatus may scale a motion estimation value estimated at the intermediate level by two times and use the scaled motion estimation value as a motion initial value at a lowest level.

Like an operation performed in the intermediate level, the image-processing apparatus may estimate motion of the new input image 1045 with respect to a standard image, and perform an image process to obtain a result image (low frequency band image) 1050. The result image 1050 obtained via the above process may be a final result image for one reference image. When the final result image for one reference image is obtained, the image-processing apparatus may repeatedly perform the above process on the next reference image.

FIG. 11 is a flowchart of an operation of an image-processing method according to an exemplary embodiment.

In S1110, hierarchical image structures each including hierarchical images of "n" levels are obtained with respect to a standard image and a reference image. The reference image may be a plurality of successively captured images. While the hierarchical image structures are obtained, standard representative values for standard regions of the standard image and reference representative values for reference regions of the reference image may be obtained together from hierarchical images. In this case, the standard representative values and the reference representative values are not deleted but stored in a memory.

In S1120, an image process starts from a level "n" which is an uppermost level. In this case, a level, which becomes an object of the image process, may be defined as a level "N". Therefore, the level "N" is determined as a level "n" initially.

In S1130, standard representative values of respective standard regions of the standard image and reference representative values of respective reference regions of the reference image are obtained from a hierarchical image of the level "N".

In S1140, motion information including a motion vector between a pixel of the standard image and a pixel of the reference image calculated depending on a result of comparison between hierarchical images of the level "N" of the standard image and hierarchical images of the level "N" of the reference image is obtained.

In S1150, similarity between standard regions of the standard image and reference regions of the reference image is determined from standard representative values for the standard regions of the standard image and reference representative values for the reference regions of the reference image that match each other based on motion information. The standard representative value is obtained from pixel values of pixels inside the standard region, and the reference representative value is obtained from pixel values of pixels inside the reference region. In this case, the pixel value denotes a value of a brightness or color difference component of a pixel. The standard representative value may be an average value or a weighted average value of pixel values inside the standard region. Likewise, the reference representative value may be an average value or a weighted average value of pixel values inside the reference region. Similarity may be determined through comparison of an absolute value of a difference between the standard representative value and the reference representative value with a threshold determined in advance.

In S1160, a noise is removed by applying temporal filtering to the standard image and the reference image with respect to the level "N" depending on the determined similarity. Whether to perform temporal filtering may be determined through comparison of similarity with the threshold determined in advance. Temporal filtering may be performed by adding weight to reference regions of the reference image depending on the size of the similarity.

In S1170, when the level "N" is a level 1, which the lowest level, after noise removing for the level "N" is completed, the image-processing method is ended.

In S1180, when the level "N" is not the level 1, the next lower level of the level "N" is newly determined as the level "N". Then, S1130 to S1170 are repeatedly performed on the newly determined level.

Consequently, the representative value-obtaining unit, the similarity-determining unit, and the noise-removing unit are sequentially performed on a hierarchical image of an uppermost level of a hierarchical image structure, and functions of the above constituent units are repeatedly performed on a hierarchical image of a one step-lower level, and the operations are repeated until functions of the above constituent units are performed on a hierarchical image of a lowest level, so that an output image may be obtained.

Meanwhile, an image-processing method according to an exemplary embodiment may be recorded as a program that is executable on a computer, and may be implemented on a general digital computer that operates the program by using a non-transitory computer-readable recording medium. The non-transitory computer-readable recording medium includes a storage medium such as a magnetic storage medium (for example, ROM, a floppy disk, a hard disk, etc.) and an optical recording medium (for example, a CD-ROM, a DVD, etc.).

Up to now, exemplary embodiments of the inventive concept have been described. A person of ordinary skill in the art will understand that various changes in form and details may be made therein without departing from the essential characteristics of the inventive concept. Therefore, it should be understood that exemplary embodiments described herein should be considered in a descriptive sense only and not for purposes of limitation. It should be construed that the scope of the inventive concept is defined by the following claims, not the above descriptions, and all differences within equivalents thereof are included in the inventive concept.

The invention claimed is:

1. An image-processing method of removing noise from an image, performed by an image processing apparatus, the method comprising:
   obtaining, by the image processing apparatus, a standard representative value for a standard region of a standard image from pixel values of pixels inside the standard region and a reference representative value for a reference region of a reference image from pixel values of pixels inside the reference region;
   obtaining, by the image processing apparatus, a hierarchical image structure of the standard image and a hierarchical image structure of the reference image based on the standard representative value and the reference representative value, each hierarchical image structure comprising a plurality of hierarchical images having different resolutions;
   matching, by the image processing apparatus, the standard region in the hierarchical image structure of the standard image to the reference region in the hierarchical image structure of the reference image based on motion information of the standard image and the reference image;
   determining, by the image processing apparatus, a similarity factor of the standard regions and the reference regions based on the standard representative values and the reference representative values; and
   removing, by the image processing apparatus, noise of the standard region by applying temporal filtering to the standard region based on the reference region when the similarity factor indicates that the temporal filtering to the standard region is performed based on the reference region.

2. The method of claim 1,
   wherein the standard representative value is an average value or a weighted average value of the pixel values inside the standard region, and
   wherein the reference representative value is an average value or a weighted average value of the pixel values inside the reference region.

3. The method of claim 1, further comprising:
   obtaining motion information comprising a motion vector between a pixel of the standard image and a pixel of the reference image calculated depending on a result of comparing the hierarchical images of the standard image with the hierarchical images of the reference image.

4. The method of claim 3, wherein the determining of the similarity factor comprises:
   determining the similarity factor by comparing the standard representative value of the standard region with the reference representative value of the reference region that match the standard representative value.

5. The method of claim 1, wherein the determining of the similarity factor comprises:
   determining the similarity factor by comparing an absolute value of a difference between the standard representative value and the reference representative value with a threshold determined in advance.

6. The method of claim 1, wherein the removing of the noise comprises:
   when it is determined that the standard region of the standard image are similar to the reference region of the reference image, adding weight to the reference region of the reference image depending on the similarity between the standard region of the standard image and the reference region of the reference image, and applying temporal filtering to calculate a weighted average of the standard region and the reference region; and
   when it is determined that the standard region of the standard image are not similar to the reference region of the reference image, not applying the filtering.

7. The method of claim 1, comprising:
   sequentially performing the obtaining of the standard representative value and the reference representative value, the determining of the similarity factor, and the removing of the noise on a hierarchical image of an uppermost level to a hierarchical image of a lowest level of the hierarchical image structure.

8. A non-transitory computer-readable recording medium having recorded thereon a program for executing the image-processing method of claim 1.

9. An image-processing apparatus for removing noise from an image, the apparatus comprising:
   a memory configured to store instructions; and
   at least one processor electrically coupled to the memory, that when executing the stored instructions, is configured to:
      obtain a standard representative value for a standard region of a standard image from pixel values of pixels inside the standard region and a reference representative value for a reference region of a reference image from pixel values of pixels inside the reference region,
      obtain a hierarchical image structure of the standard image and a hierarchical image structure of the reference image based on the standard representative value and the reference representative value, each hierarchical image structure comprising a plurality of hierarchical images having different resolutions,
      match the standard region in the hierarchical image structure of the standard image to the reference region in the hierarchical image structure of the reference image based on motion information of the standard image and the reference image, determine a similarity factor of the standard regions and the reference regions based on the standard representative values and the reference representative values, and remove noise of the standard region by applying temporal filtering to the standard region based on the reference region when the similarity factor indicates that the temporal filtering to the standard region is performed based on the reference region.

10. The apparatus of claim 9, wherein the at least one processor is further configured to:

use the standard representative value as an average value or a weighted average value of the pixel values inside the standard region, and use the reference representative value as an average value or a weighted average value of the pixel values inside the reference region.

11. The apparatus of claim 9,
wherein the at least one processor is further configured to obtain motion information comprising a motion vector between a pixel of the standard image and a pixel of the reference image calculated depending on a result of comparing the hierarchical images of the standard image with the hierarchical images of the reference image.

12. The apparatus of claim 11, wherein the at least one processor is further configured to determine the similarity factor by comparing the standard representative value of the standard region with the reference representative value of the reference region that match the standard representative value, based on the motion information.

13. The apparatus of claim 9, wherein the at least one processor is further configured to determine the similarity factor by comparing an absolute value of a difference between the standard representative value and the reference representative value with a threshold determined in advance.

* * * * *